United States Patent
Hardt et al.

(10) Patent No.: US 11,196,732 B2
(45) Date of Patent: *Dec. 7, 2021

(54) SINGLE SIGN-ON REGISTRATION

(71) Applicant: Amazon Technologies, Inc., Seattle, WA (US)

(72) Inventors: Dick Clarence Hardt, Seattle, WA (US); Darin Keith McAdams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,562

(22) Filed: Mar. 12, 2020

(65) Prior Publication Data

US 2020/0220854 A1    Jul. 9, 2020

Related U.S. Application Data

(63) Continuation of application No. 15/677,930, filed on Aug. 15, 2017, now Pat. No. 10,630,668.

(Continued)

(51) Int. Cl.
*H04L 29/06* (2006.01)
*H04L 29/08* (2006.01)

(52) U.S. Cl.
CPC .......... *H04L 63/08* (2013.01); *H04L 63/0807* (2013.01); *H04L 63/0815* (2013.01);
(Continued)

(58) Field of Classification Search
CPC ... H04L 63/08; H04L 63/205; H04L 63/0815; H04L 63/0807; H04L 67/06; H04L 67/02; H04L 67/146
See application file for complete search history.

(56) References Cited

U.S. PATENT DOCUMENTS 9,137,228 B1    9/2015 Newstadt
2009/0300745 A1*  12/2009 Dispensa .............. H04L 63/166
                                                            726/7
(Continued)

FOREIGN PATENT DOCUMENTS

CN        101771677 A    7/2010
CN        103999401 A    8/2014
(Continued)

OTHER PUBLICATIONS

Hunt et al., "System for Cross-Domain Identity Management: Core Schema," Request for Comments: 7643, Standards Track, Sep. 2015, 104 pages.

(Continued)

*Primary Examiner* — J. Brant Murphy
(74) *Attorney, Agent, or Firm* — Davis Wright Tremaine LLP

(57) ABSTRACT

An identity provider receives a request to configure authentication for enabling single sign-on to a service provider. The identity provider identifies the authentication protocols supported by the service provider and determines whether it is compatible with these authentication protocols. As a result of the identity provider being compatible with at least some of the authentication protocols, the identity provider generates configuration information that is usable by the service provider to configure the authentication. The identity provider transmits, to a computer system, a response that causes the computer system to be redirected to the service provider in order to provide information usable by the service provider to obtain the configuration information.

20 Claims, 10 Drawing Sheets

Related U.S. Application Data

(60) Provisional application No. 62/492,059, filed on Apr. 28, 2017.

(52) U.S. Cl.
CPC ............ H04L 63/205 (2013.01); H04L 67/02 (2013.01); H04L 67/06 (2013.01); H04L 67/146 (2013.01)

(56) References Cited

U.S. PATENT DOCUMENTS

| | | | | |
|---|---|---|---|---|
| 2011/0265155 A1* | 10/2011 | Liu | ..................... | H04L 63/0884 726/5 |
| 2011/0265172 A1* | 10/2011 | Sharma | ............... | H04L 63/0815 726/8 |
| 2013/0179573 A1* | 7/2013 | McCarty | ................. | G06F 9/505 709/225 |
| 2013/0191884 A1* | 7/2013 | Leicher | ............... | H04L 63/0815 726/4 |
| 2014/0189123 A1* | 7/2014 | Dodd | ..................... | H04L 47/70 709/226 |
| 2014/0310792 A1* | 10/2014 | Hyland | ............... | H04L 63/0815 726/8 |
| 2015/0188906 A1* | 7/2015 | Minov | .................. | H04L 63/062 726/8 |
| 2015/0188909 A1* | 7/2015 | Hyland | ................... | G06F 21/41 726/4 |
| 2016/0072789 A1* | 3/2016 | Loo | ..................... | H04L 63/0853 726/7 |
| 2016/0277390 A1 | 9/2016 | Minov et al. | | |
| 2016/0366121 A1* | 12/2016 | Rykowski | ........... | H04L 63/0815 |
| 2017/0078284 A1* | 3/2017 | Dispensa | .............. | H04L 63/166 |
| 2017/0149767 A1* | 5/2017 | Hinton | .................... | H04L 63/10 |
| 2018/0234416 A1* | 8/2018 | Moerk | ................ | G06F 16/9024 |

FOREIGN PATENT DOCUMENTS

| | | |
|---|---|---|
| CN | 105144656 A | 12/2015 |
| WO | 2010083889 A1 | 7/2010 |

OTHER PUBLICATIONS

Hunt et al., "System for Cross-Domain Identity Management: Protocol," Request for Comments: 7644, Standards Track, Sep. 2015, 89 pages.

International Search Report and Written Opinion, dated Jun. 29, 2018, International Patent Application No. PCT/US2018/29183, filed Apr. 24, 2018, 13 pages.

Li et al., "Systems for Cross-Domain Identity Management: Definitions, Overview, Concepts, and Requirements," Request for Comments: 7642, Informational, Sep. 2015, 19 pages.

Chinese First Office Action dated Jun. 25, 2021, Patent Application No. 201880033782.5, 8 pages.

\* cited by examiner

SINGLE SIGN-ON REGISTRATION

CROSS REFERENCE WITH RELATED APPLICATION

This application is a continuation of U.S. patent application Ser. No. 15/677,930, filed Aug. 15, 2017, which claims the benefit of U.S. Provisional Patent Application No. 62/492,059, filed Apr. 28, 2017, the disclosures of which are incorporated herein by reference in their entirety.

BACKGROUND

Identity providers and other enterprises often enable users to establish a federated identity that can be used to access various service providers through use of a single set of authentication credentials. However, while standards such as Security Assertion Markup Language (SAML) and OpenID Connect (OIDC) are popular for establishing federated identities, there remains significant friction in setting up new relationships between identity providers and service providers. As a result of this friction, users create alternative credentials for accessing these service providers. This can make the user experience more cumbersome, as users are required to maintain multiple sets of credentials.

BRIEF DESCRIPTION OF THE DRAWINGS

Various techniques will be described with reference to the drawings, in which.

DETAILED DESCRIPTION

Figure 1:
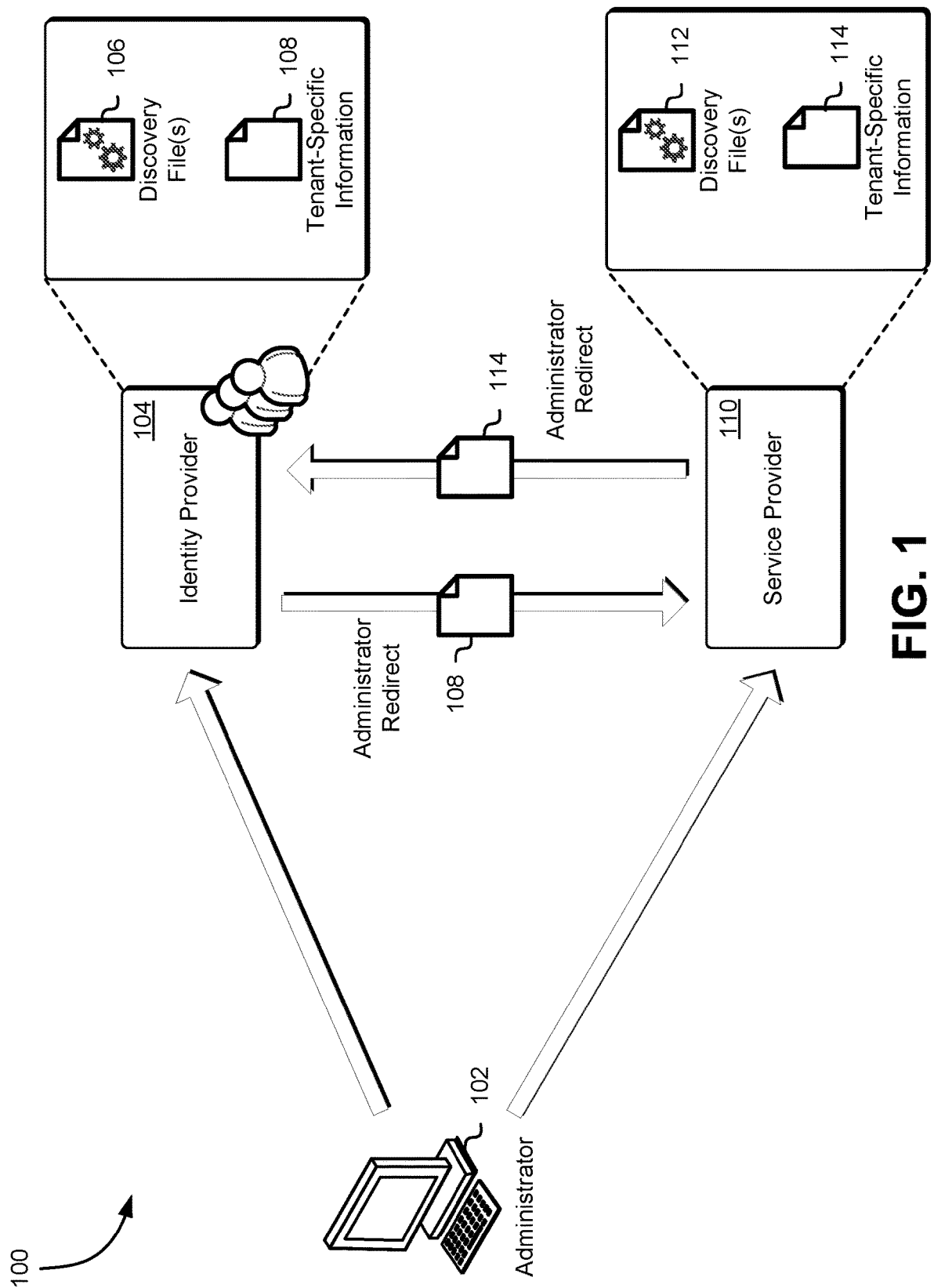
FIG. 1 shows an illustrative example of a system in which various embodiments can be implemented.

Techniques described and suggested herein relate to instantiating federation relationships between identity providers and service providers programmatically. In an embodiment, a user navigates to a user interface provided by an identity provider to register a federation relationship between the identity provider and a service provider specified by the entity. The identity provider, in an embodiment, configures the user interface to enable selection from multiple service providers, as well as provides an input field where the entity provides a Uniform Resource Identifier (URI) or other identifying information of another service provider to be used to establish the federation relationship. In response to the entity selecting a service provider through the user interface, in an embodiment, the identity provider obtains the service provider's federation discovery file, which specifies the service provider's supported authentication protocols and its communications handshake URI.

In an embodiment, the identity provider generates tenant-specific information and an initial access token, where the tenant-specific information specifies attributes of the identity provider that are used by the service provider to establish a federation relationship with the identity provider and the initial access token is usable by the service provider to access the tenant-specific information for the identity provider to establish the federation relationship. In an embodiment, the identity provider redirects the entity to the service provider by using a URI specified in the service provider's federation discovery file. The service provider receives the request from the identity provider and begins its registration process.

The service provider, in one embodiment, uses the initial access token from the identity provider to download the identity provider's tenant-specific information and verifies that it is compatible with the authentication protocols specified by the identity provider in the tenant-specific information. The service provider uses the tenant-specific information to convert the initial access token into an access token that is used for future communications where the service provider initiates communication with the identity provider. In an embodiment, the service provider generates its own initial access token and tenant-specific information that is to be shared with the identity provider to enable the identity provider to establish the federation relationship. The service provider redirects the entity back to the identity provider and provides the identity provider with the initial access token and the location of the service provider's tenant-specific information.

The identity provider, in one embodiment, uses the initial access token provided by the service provider to obtain the service provider's tenant-specific information and completes the registration process. The identity provider uses the tenant-specific information to convert the initial access token from the service provider into an access token to be used for future communications where the identity provider initiates communications with the service provider. The identity provider grants permissions to the entity to access the service provider using a federated identity. Further, in an embodiment, the identity provider enables the entity to identify other users that are permitted to access the service provider using a federated identity, thereby enabling other users designated by the entity to utilize the federated identity to access the service provider and access resources designated for use by the entity.

In this manner, in an embodiment, a federation relationship is established between an identity provider and a service provider in programmatic fashion, with minimal input from administrators or other users of the identity provider and the service provider. In addition, the techniques described and suggested herein facilitate additional technical advantages. For example, because the identity provider and the service provider each generate their own sets of initial access tokens and tenant-specific information as part of establishment of the federation relationship on behalf of the entity, this process is initiated by either the identity provider or the service provider at the behest of the entity. This provides flexibility for the entity to define and establish the federation relationship without need to understand any of the underlying technologies behind the establishment of such a federation relationship.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, an administrator 102 or other user of resources provided by a service provider 110, submits a request to an identity provider 104 to initiate a federation relationship between the identity provider 104 and the service provider 110. The identity provider 104 comprises a set of computer systems (e.g., configured with processor-executable instructions) that manages user identities for various entities. In an embodiment, the identity provider 104 renders a user interface to be used by the administrator 102 to initiate a registration process for establishing the federation relationship between the identity provider 104 and the service provider 110. In an embodiment, the user interface (and other user interfaces discussed herein) is rendered as a web page using techniques such as discussed below. The service provider 110 provides the applications, such as Software-as-a-Service (SaaS) applications and/or other applications accessible via a communications network, that are utilized by the administrator 102 and other users permitted to access these applications by the administrator 102. In an embodiment, the identity provider 104 and/or the service provider 110 performs another role, such as the identity provider 104 serving a service provider in another context and/or service provider 110 servicing as an identity provider in another context.

In an embodiment, the user interface is a graphical user interface, comprising one or more graphical elements (e.g., radio buttons, text entry fields, buttons, etc.) that are used by the administrator 102 via a user interface device (e.g., mouse, keyboard, touchscreen, etc.) to submit its request. The contents of the user interface, in an embodiment, are provided at the discretion of the identity provider 104 and define a catalog of applications where a federation discovery URI for each known or common service provider is predefined. Alternatively, in an embodiment, the administrator 102 manually enters a URI corresponding to the location of a federation discovery file 112 for the service provider 110 or for any other service provider that includes an application that is accessible through use of a federated identity.

In an embodiment, the identity provider 104 publishes a federation discovery file 106 that is accessible via a publicly accessible URI. The federation discovery file 106, in one embodiment, comprises information to be used to bootstrap a registration handshake which is a minimal amount of information necessary to bootstrap the federation registration handshake between the identity provider 104 and a service provider, such as service provider 110. In an embodiment, the federation discovery file 106 is generated using JavaScript Object Notation (JSON), Extensible Markup Language (XML), or any other structured markup language. The federation discovery file 106, in one embodiment, contains a field that identifies the role the identity provider 104 is performing. In an embodiment, since the identity provider 104 performs the role of an identity provider and of a service provider, the field is usable to specify that the identity provider 104 serves both roles. Alternatively, in an embodiment, the identity provider 104 performs the federation registration twice, once as an identity provider and once as a service provider, if the identity provider 104 serves both roles.

The federation discovery file 106, in an embodiment, includes information specifying a federation registration handshake endpoint that is the location where a user agent is directed in order to perform the federation registration handshake. In an embodiment, the federation registration handshake endpoint is a URI that specifies the location described above. If the identity provider 104 also serves the role of being a service provider, the federation discovery file 106, in an embodiment, is used to declare the supported authentication protocols. The supported authentication protocols, in an embodiment, include SAML, OIDC, or another protocol that is usable to establish the federation registration handshake. The identity provider, in an embodiment, uses a selection algorithm to identify the authentication protocol to be used in establishing the federation registration handshake. The selection algorithm, in an embodiment, is based on the administrator's 102 recorded preferences, the capabilities of the identity provider, and/or any other factor. In an embodiment, the federation discovery file 106 also includes the application name, logo URI, and other displayable information presentable via a user interface.

The service provider 110, in an embodiment, also makes available a federation discovery file 112 that is discoverable by the identity provider 104. The federation discovery file 112, in an embodiment, is similar to the federation discovery file 106 described above, such as by specifying the location where the user agent of the identity provider 104 should be directed in order to perform the federation registration handshake. In an embodiment, the location is defined using a URI that is usable to access the location. The federation discovery file 112, in an embodiment, specifies the authentication protocols supported by the service provider 110, as well as the application name, logo URI, and other displayable information that is to be rendered via the user interface provided by the identity provider 104 to the administrator 102. In an embodiment, such displayable information is optionally included.

In an embodiment, the identity provider 104 renders, on the user interface, one or more graphical buttons, each corresponding to an application made available by a service provider and where the federation discovery URI for the service provider's federation discovery file is predefined. The administrator 102 selects any of the one or more graphical buttons to identify the application for which the federated relationship is being defined. As described above, the administrator 102 alternatively provides a federation discovery URI corresponding to the location of a federation discovery file of a service provider that maintains an application that is to be accessed using a federated identity. In an embodiment, the identity provider 104 authenticates the administrator 102 to ensure that the administrator 102 is authorized to register new applications and federated relationships.

The user interface also includes a start registration button or other method for indicating that the administrator 102 is prepared to initiate the registration process. If the administrator 102 provides an indication that the identity provider 104 is to initiate the registration process based at least in part on the information provided (e.g., selection of an application graphical button, entering a federation discovery URI, etc.), the identity provider 104 renders a confirmation page using the user interface. In an embodiment, since the federation registration handshake results in private information being exposed to the service provider 110, the confirmation page is updated to include notifications or terms and conditions that are applicable to the situation. The administrator 102 is provided the opportunity to grant or deny access to private information, either as a whole, or by selecting which private information is to be shared. Alternatively, the identity provider 104 displays nothing and immediately directs the administrator 102 to the next step, such as if the administrator 102 has used configuration information to determine on behalf of other users which private information is to be shared.

In an embodiment, the confirmation step is initiated by making a HyperText Transfer Protocol (HTTP) POST request to the identity provider's 104 federation handshake endpoint and passing the service provider's 110 federation discovery URI. In an alternative embodiment, the confirmation step is initiated using an HTTP GET request. Additionally, in an embodiment, the identity provider 104 obtains the service provider's 110 federation discovery file 112 and extracts the service provider's 110 supported authentication protocols and the federation registration handshake endpoint URI. The federation discovery file 112, in one embodiment, is similar to the federation discovery file 106. In an embodiment, the federation discovery file 112 is generated using JSON, XML, or any other structured markup language. Based at least in part on the supported authentication protocols supported by the service provider 110, the identity provider 104 determines whether it is compatible with any of these authentication protocols. The identity provider 104, in an embodiment, performs additional validation, such as ensuring that the selected application is part of a whitelisted collection of trusted applications.

The identity provider 104 evaluates the authentication protocols specified in the federation discovery file 112 to determine which authentication protocol to use for the federation registration handshake. In an embodiment, the identity provider 104 uses an authentication selection algorithm to select the authentication protocol that is to be used. The authentication selection algorithm is based at least in part on a ranking of the supported authentication protocols, whereby a higher rank is assigned to a more commonly used authentication protocol and the like.

In an embodiment, the identity provider 104 creates an initial access token and a nonce that is provided to the service provider 110 to enable the service provider 110 to access the identity provider's tenant-specific information 108, as described below. The initial access token and nonce is used by the service provider 110 to call an OAuth endpoint and attain access tokens and refresh tokens in order to interact with the identity provider 104 programmatically. In an embodiment, the identity provider 104 also generates a return URI, which is used by the service provider 110 to redirect the administrator 102 or other user (i.e., to redirect a device operated by the administrator 102 or other user) back to the identity provider 104 to finish the federation registration handshake. Optionally, the identity provider 104 generates a state attribute, which encodes any state that the identity provider 104 wants to preserve across the federation registration handshake. This state attribute is passed to the service provider 110 and echoed back to the return URI.

The identity provider 104, in an embodiment, generates or otherwise makes available private tenant-specific information 108 that is usable by the service provider 110 and other authorized entities (e.g., other service providers, etc.) to configure the federation registration handshake. Access to the tenant-specific information 108 is restricted to holders of the initial access token described above. The tenant-specific information 108 includes a displayable name for the identity provider 104, which is subject to a limit on the length of the displayable name. In an embodiment, the displayable name is a required field. The tenant-specific information 108 also includes a logo URI that is used to provide a location for a displayable logo that represents the identity provider 104. In an embodiment, the logo URI is an optional field. Further, the logo URI is subject to a limitation on the size of the image (in bytes and/or geometric dimensions) and/or a limit on which image formats the logo is to be encoded in.

The tenant-specific information 108 specifies at least one authentication protocol that the identity provider 104 supports and uses. This is used by the service provider 110 to determine whether it is compatible with any authentication protocols used by the identity provider 104 as part of the process for establishing the federation registration handshake. In an embodiment, if the identity provider 104 specifies, in the tenant-specific information 108, that it is capable of using SAML as an authentication protocol, the tenant-specific information 108 specifies a SAML metadata URI. The SAML metadata URI refers to a location of a metadata document that specifies an IDPSSODescriptor, which describes the single sign-on server provided at the identity provider 104. In an embodiment, if the identity provider 104 specifies, in the tenant-specific information 108, that it supports the OIDC authentication protocol, the tenant-specific information 108 will include an OIDC configuration URI. The OIDC configuration URI corresponds to a location for an OpenID Provider configuration document. Access to the SAML metadata document and the OpenID Provider configuration document is contingent on the use of an access token generated using the initial access token provided by the identity provider 104.

In an embodiment, the tenant-specific information 108 specifies an OAuth token endpoint, which includes a URI for the location where a refresh token is usable as part of an OAuth token exchange for obtaining an access token. The tenant-specific information 108 also specifies a System for Cross-domain Identity Management (SCIM) endpoint URI, which corresponds to a location that specifies SCIM operations exposed by identity providers, such as identifying a user profile by an identifier. This SCIM endpoint is not usable by the service provider 110 until the federation registration handshake has been established. In an embodiment, it is required that the tenant-specific information 108 specify an SCIM endpoint. The tenant-specific information 108 also specifies one or more supported attributes, which describe the collection of SCIM user attributes that the identity provider 104 makes available. These are expressed as a collection of SCIM attribute names. The SCIM user attributes specified therein are included in accordance with the administrator's 102 approval of their release to the service provider 110.

The identity provider 104, in an embodiment, redirects the administrator 102 to the service provider 110 to execute a similar sequence of operations to those described above. This redirection of the administrator 102 is accomplished by issuing an HTTP 302 response to the location that the service provider 110 has specified in its federation discovery file 112. In the response, the identity provider 104 provides the initial access token and nonce, as well as the return URI and the URI for the tenant-specific information 108.

In response to receiving the HTTP 302 response, the service provider 110 begins its federation registration process. This includes authenticating the administrator 102, enabling the administrator 102 to create a new account, configuring settings for billing the administrator 102, and the like. Further, in an embodiment, the service provider 110 obtains the initial access token from the response and uses the URI for the tenant-specific information 108 to obtain the tenant-specific information 108. The service provider 110 extracts the attributes from the tenant-specific information 108 and determines whether it is compatible with the identity provider 104. In an embodiment, the service provider 110 examines the authentication protocols, the supported attributes, and specific details within the SAML/OIDC configuration files to determine whether any incompatibilities exist. If any incompatibilities exist, the service provider 110 stops performing the registration process and displays, via a user interface, an error message or performs one or more operations to resolve the detected incompatibilities.

In an embodiment, the service provider 110 uses the OAuth endpoint specified in the tenant-specific information 108 to convert the initial access token and nonce into an access token and a refresh token. The access token and refresh token are used for future communications where the service provider 110 initiates communication with the identity provider 104. Further, the service provider 110 generates its own initial access token and nonce that are to be provided to the identity provider 104. This newly generated initial access token and nonce is used by the identity provider 104 to complete its processes for establishing the federation registration handshake.

If the service provider 110 uses the OIDC protocol, the service provider 110 performs OIDC Dynamic Registration with the identity provider 104 as per OIDC specifications. The registration endpoint is discoverable by the service provider 110 via the OpenID Provider configuration document, which is accessible by using the URI specified in the tenant-specific information 108. In an embodiment, in order to support the OIDC protocol, the identity provider 104 is configured to support dynamic registration.

In an embodiment, the service provider 110 registers the identity provider 104 as a trusted party for single sign-on purposes. The service provider 110 persists single sign-on information into a database and schedule recurring activities, including cryptographic key rotations. In an embodiment, the database is implemented as a web service, such as a multi-tenant web service hosted by a computing resource service provider, which is the same entity as the identity provider 104 or a different entity (e.g., a customer of the computing resource service provider). The database is a noSQL database, a relational database, an object-based data store, or other type of data structure, which all are operable as web services by the computing resource service provider.

In addition, the service provider 110, in an embodiment, generates or otherwise makes available its own tenant-specific information 114. Access to this tenant-specific information 114 is restricted to holders of the initial access token, such as the identity provider 104. The tenant-specific information 114 includes similar entries as those specified in the tenant-specific information 108, such as a displayable name for the service provider 110, a URI corresponding to a location for a logo that represents the service provider 110, a URI for an OAuth token exchange for use of the refresh token, and the like. The tenant-specific information 114 describes the authentication protocols that the service provider 110 will support, such as SAML, OIDC, another, or multiple protocols for the identity provider 104. In an embodiment, the tenant-specific information 114 includes a URI for a SAML metadata document that specifies a service provider single sign-on descriptor (SPSSODescriptor). In an embodiment, an access token is used by the identity provider 104 to access the SAML metadata document.

In an embodiment, the tenant-specific information 114 specifies a URI for a location that includes one or more SCIM operations exposed by service providers, such as those necessary for user provisioning of resources and the like. The tenant-specific information 114 includes a provisioning mode field, which is used to describe how the identity provider 104 should provision users into the service. The provisioning mode field enables options to specify none, just-in-time (JIT), pre-provision, and other options. In an embodiment, the provisioning mode is required. The tenant-specific information 114 also specifies one or more desired attributes, which describe user attributes the service provider 110 would like to receive from the identity provider 104, and whether these attributes are essential or optional. In an embodiment, the desired attributes field in the tenant-specific information 114 is required. The tenant-specific information 114 also includes an attribute mapping field, which describes how to map SCIM attributes into SAML attributes or OIDS claims. This mapping is usable to maintain compatibility with existing infrastructure. In an embodiment, the attribute mapping field is optional.

In an embodiment, once the tenant-specific information 114 for the service provider 110 has been generated or otherwise made available, the service provider 110 redirects the administrator 102 back to the identity provider 104. The redirection of the administrator 102 is accomplished by issuing an HTTP 302 response to the location originally provided by the identity provider 104 in the return URI. As part of the return parameters, the service provider 110 provides access tokens and the location of the service provider's 110 tenant-specific information 114. In an embodiment, the service provider 110 echoes back the state originally provided by the identity provider 104, as specified in the state attribute generated by the identity provider 104.

In response to a request from the user resulting from the HTTP 302 response from the service provider 110, the identity provider 104 completes the registration process. In an embodiment, the identity provider 104 obtains the service provider's tenant-specific information 114 by using the initial access token provided by the service provider 110. The identity provider 104 uses the OAuth endpoint URI specified in the tenant-specific information 114 to access the OAuth endpoint and convert the initial access token and nonce into an access token and a refresh token. These tokens are used for future communications where the identity provider 104 initiates communication to the service provider 110. In an embodiment, the OAuth endpoint specified in the tenant-specific information 114 is the same OAuth endpoint specified in the tenant-specific information 108. The identity provider 104 finalizes the federation registration handshake and enables single sign-on to the service provider 110 for the administrator 102. In an embodiment, the identity provider 104 persists the single sign-on information into a database, grants permissions, and schedules recurring activities, such as key rotations.

Once the registration process has been completed, other ongoing activities are performed as part of the single sign-on relationship. In an embodiment, when an end-user, such as administrator 102, signs in to an application, a SAML or OIDC flow occurs to enable access to the application. However, the identity provider 104 applies any federation attribute mappings defined by the service provider 110 when performed the SAML or OIDC flow. Some applications require ongoing user provisioning. Such applications declare the provisioning mode in their tenant-specific information and, if necessary, provide a SCIM endpoint for provisioning. The identity provider 104 executes the declared provisioning mode.

In an embodiment, cryptographic key materials utilized by SAML and OIDC are rotated automatically, on an appropriate schedule, and without causing temporary downtime to single sign-on users, such as administrator 102. Systems operating in accordance with the process described above operate such that SAML NameID is populated with the SCIP username and be of type "unspecified," although administrator 102, in an embodiment, defines a mapping. Further, in an embodiment, no extended attributes are used, but rather a predefined list of support SCIM schemas is provided. In an embodiment, automatic cryptographic key rotation is supported by the identity provider 104 and the service provider 110 in order to avoid requiring users, such as administrator 102, to understand how to utilize cryptographic keys and/or rotate these cryptographic keys. In an embodiment, provisioning, if required, uses SCIM. The service provider 110 defines custom attribute mappings and, once defined, are reused across all integrations. This eases adoption by allowing the service provider 110 to avoid making changes to its existing SAML/OIDC endpoints.

The techniques described herein also include identifying unique registrations between the identity provider 104 and the service provider 110. In an embodiment, there are "Production" and "Sandbox" instances of the same application. Alternatively, different departments in a company create instances for "Sales," "Finance," "Vendors," etc. In an embodiment, the equivalent of a SAML EntityID is used. Further, the techniques described herein are also adaptable to provide convenient user interfaces for the registration processes described above. These user interfaces are described below in connections with FIGS. 2-6. Techniques described here are also adaptable to allow an administrator 102 or other user to specify registrations for multiple service provider accounts at once, such as by enabling such accounts to be grouped and selected in a user interface. The flows of information are adapted accordingly, such as repeatedly performed for each account, or by transferring information that is bundled for multiple accounts. In an embodiment, systems employing the techniques described herein allow for entity relationships to evolve over time. These systems enable users to update their logo or switch authentication protocols.

In an embodiment, various cryptographic techniques are used to enable additional functionality. As discussed above, registration processes of the present disclosure involve specifying which users have access to an application of the service provider 110. In one embodiment, a trust broker is used to broaden the ability to specify who does and does not have access to the application. In an embodiment, the registration process allows for the administrator 102 to specify a trust broker and to provide information that enables cryptographic authentication of information as associated with the trust broker, such as a digital certificate of the trust broker. A user uses cryptographic information (e.g., a digital certificate or other information digitally signed by a trust broker) to demonstrate to the service provider 110 that the user is a member of a group associated with the trust broker. The attainment of such cryptographic information is orchestrated by the identity provider 104 at the time of sign on, which involves a synchronous call to the trust broker (e.g., to obtain a digital signature) during a sign on process or by using information stored in association with the trust broker that was obtained asynchronously with the sign on process (e.g., as part of a configuration of the identity provider 104), such as by using a digital certificate signed by the trust broker to digitally sign information that is presented to the service provider 110 (e.g., using a private key associated with the digital certificate). Other variations are also considered as being within the scope of the present disclosure.

Figure 2:
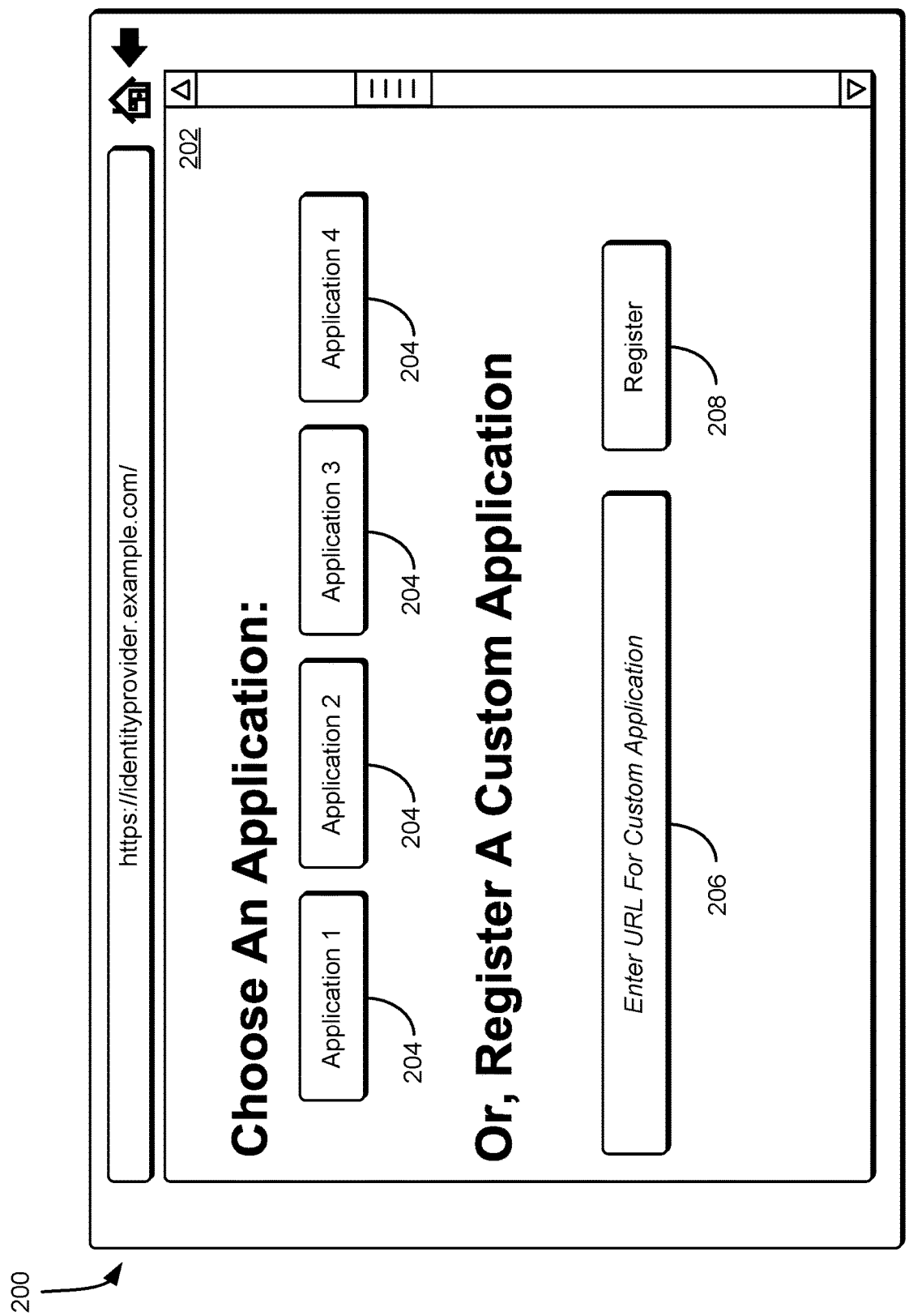
FIG. 2 shows an illustrative example of a system in which an interface is provided for identifying a service provider for establishing federated authentication in accordance with at least one embodiment.

FIG. 2 shows an illustrative example of a system 200 in which an interface 202 is provided for identifying a service provider for establishing federated authentication in accordance with at least one embodiment. In an embodiment, the interface 202 is a graphical user interface that is accessible by a user, such as an administrator, via a communications network. In an embodiment, the identity provider determines whether the user has provided valid information usable to authenticate the user. If the user is authenticated, the identity provider provides access to the interface 202. However, if the user is authenticated and is authorized to access the interface 202, the identity provider renders the interface 202 for the user.

The contents of the interface 202 are at the discretion of the identity provider. In an embodiment, the identity provider provides, via the interface 202, a catalog of applications where a federation discovery URI is predefined. In an embodiment, the identity provider provides, via the interface 202, an application graphical button 204 for each application where a federation discovery URI is predefined. Using an input device or cursor, the user of the interface 202 interacts with an application graphical button 204 to define the application that is to be selected for establishing single sign-on capabilities. In one embodiment, the identity provider also provides, via the interface 202, a custom application field 206 that the is usable by the user to provide a URI for a custom application that is to be registered for single sign-on use. The user selects the custom application field 206 and types in the URI to the location of a service provider's federation discovery file.

The interface 202, in an embodiment, includes a register graphical button 208 that the user utilizes to initiate the registration process based at least in part on the selections made using the application graphical buttons 204 or the custom application field 206. In an embodiment, if the identity provider has not authenticated the user prior to rendering the interface 202, the identity provide authenticates the user in response to detecting use of the register graphical button 208. If the user is successfully authenticated and is authorized to register new applications, the identity provider renders a start confirmation page via the interface as illustrated in FIG. 3.

Figure 3:
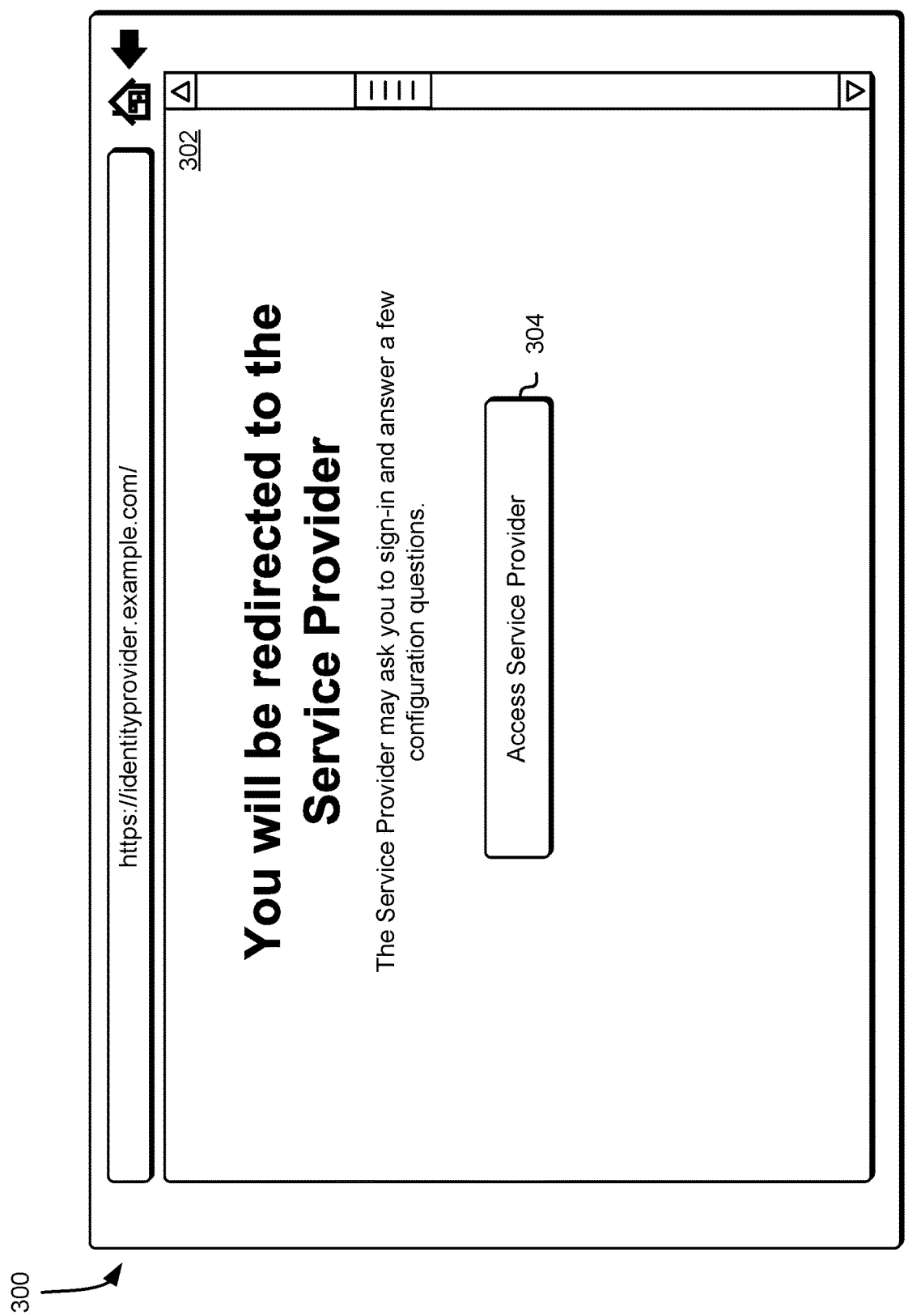
FIG. 3 shows an illustrative example of a system in which an interface is provided to indicate redirection of a user of the interface to a service provider specified by the user in accordance with at least one embodiment.

FIG. 3 shows an illustrative example of a system 300 in which an interface 302 is provided to indicate redirection of a user of the interface to a service provider specified by the user in accordance with at least one embodiment. The interface 302 is provided to the user in response to the user's selection of the register graphical button described above. The interface 302 provides the user with an opportunity to confirm that it wishes to proceed with the registration. The contents of the interface 302 and the start confirmation page are at the discretion of the identity provider. In an embodiment, the start confirmation page displayed via the interface 302 includes a notification that is used to inform the user that it will be redirected to the service provider to continue the registration process. Further, the interface 302 includes an access service provider graphical button 304 that a user selects to cause the identity provider to redirect the user to the service provider.

In an embodiment, the identity provider provides, via the interface 302, notifications or terms and conditions that are applicable to the registration process. The notifications indicate, to the user, that private information is to be exposed to the service provider by the identity provider as part of the registration. Thus, based at least in part on these notifications, the user decides whether to select the access service provider graphical button 304 to continue the registration process. In an embodiment, the user is presented with an opportunity to grant or deny access to private information, either as a whole, or by selecting, through the interface 302, which private information is to be shared. Alternatively, the identity provider optionally displays nothing through the interface 302 and immediately redirects the user to the service provider in response to selection of the access service provider graphical button 304.

Figure 4:
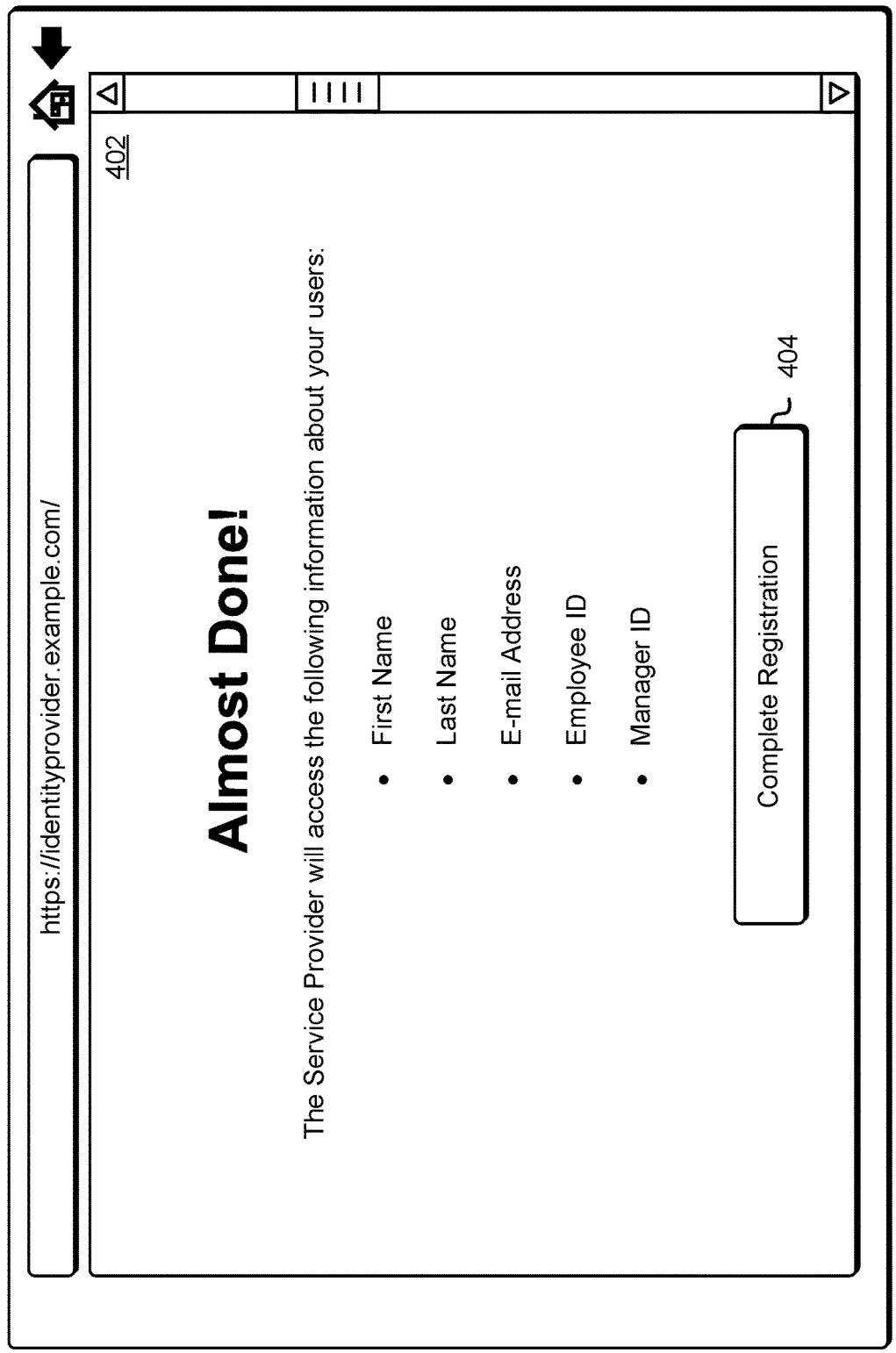
FIG. 4 shows an illustrative example of a system in which an interface is provided to a user in response to a request from the user generated as a result of being redirected from a service provider to the identity provider in accordance with at least one embodiment.

FIG. 4 shows an illustrative example of a system 400 in which an interface 402 is provided to a user in response to a request from the user generated as a result of being redirected from a service provider to the identity provider in accordance with at least one embodiment. The interface 402 includes a notification to the user that it has been redirected from the service provider to the identity provider after providing information about its sign-on preferences. Further, the notification is used to provide information regarding the information that is to be provided by the identity provider to the service provider as part of the registration process. As illustrated in FIG. 4, this includes users' first names, last names, electronic addresses, employee identifiers, and manager identifier. However, in one embodiment, additional information is specifiable through the interface 402 that is provided to the service provider as part of the registration process.

Figure 5:
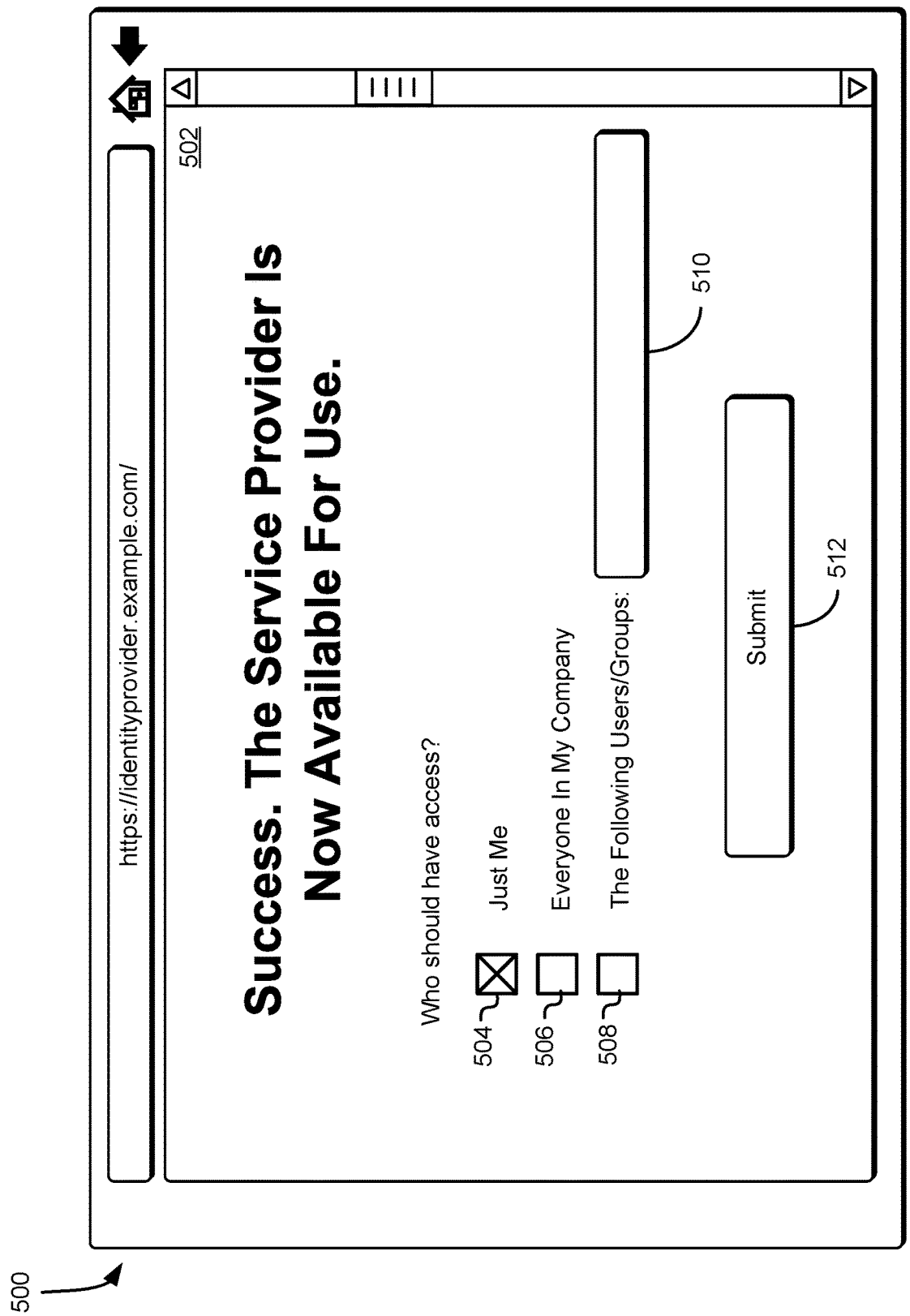
FIG. 5 shows an illustrative example of a system in which an interface is provided for identifying users that can utilize federated authentication to access the service provider in accordance with at least one embodiment.

FIG. 5 shows an illustrative example of a system 500 in which an interface 502 is provided for identifying users that are permitted to utilize federated authentication to access the service provider in accordance with at least one embodiment. After the registration process has been completed, the user utilizes single sign-on to sign in and access the application provided by the service provider. Further, in an embodiment, the identity provider updates the interface 502 to include an additional page to enable the user to identify other users that are permitted to utilize single sign-on to access the service provider and the application specified by the user. As illustrated in FIG. 5, the page presented via the interface 502 presents the user with a personal use access box 504, which the user utilizes to specify that only the user is permitted to utilize single sign-on to access the application via the service provider.

The page, in one embodiment, also includes an organization use access box 506, which is selectable to specify that everyone in the user's organization is permitted to utilize single sign-on to access the application via the service provider. The page also includes a user subset access box 508 and a user subset input field 510, which are usable to define specific users and/or groups of users that are permitted to utilize single sign-on to access the application. The members of the organization and groups are defined through the user's profile and given an entitlement corresponding to the organization. In an embodiment, the application offers different profiles/roles that are assignable to users. These entitlements are represented as custom extended attributes on the user profile, inside the identity provider. In an embodiment, information specifying entitlements is stored in a database accessible through a web service. In addition, the identity provider executes scripts which push entitlement information to the service provider if the service provider allows for and/or requires such functionality. Such scripts, on a recurring basis, push entitlement information to the service provider using an appropriate protocol, such as the SCIM protocol, defined in Request for Comment (RFC) 7642, 7643, and 7644.

In an embodiment, a mechanism for service providers is defined to declare the set of profiles/roles that are attainable. A user interface allows for a definition of which identities are permitted to access the service provider resources and which profiles the users are permitted to access. In one embodiment, the interface 502 is modifiable to allow for attribute-based definition of access to service provider resources such that, when users authenticate with the identity provider, attributes are provided as part of the authentication process. Policy decisions on access to the service provider resources and services involving those resources are evaluated based at least in part on the attributes of a user that has signed on. In an embodiment, the service provider applies conditions to attributes where satisfaction of the conditions allows for access to specific resources and/or classes of resources. This enables the service provider to use attribute-based access control based on information maintained by the identity provider. Such context includes time of day, Internet Protocol (IP) address (e.g., which range the IP address associated with the user's device is in, geographic location, and other), and/or the like.

The interface 502, as illustrated in FIG. 5, includes a submit graphical button 512, which is usable to approve and submit the entitlements specified using the access boxes 504, 506, 508 and/or the input field 510. In response to detection of use of the submit graphical button 512, the identity provider updates the user's profile to specify these new entitlements and enable the identified users to utilize single sign-on in accordance with the registration performed to access one or more applications provided by the service provider. In an embodiment, the user is permitted to access the interface 502 at any time to modify any entitlements previously defined through the identity provider. Thus, in an embodiment, the user is permitted to provide additional entitlements, modify existing entitlements, and/or revoke any entitlements for users associated with the user.

Figure 6:
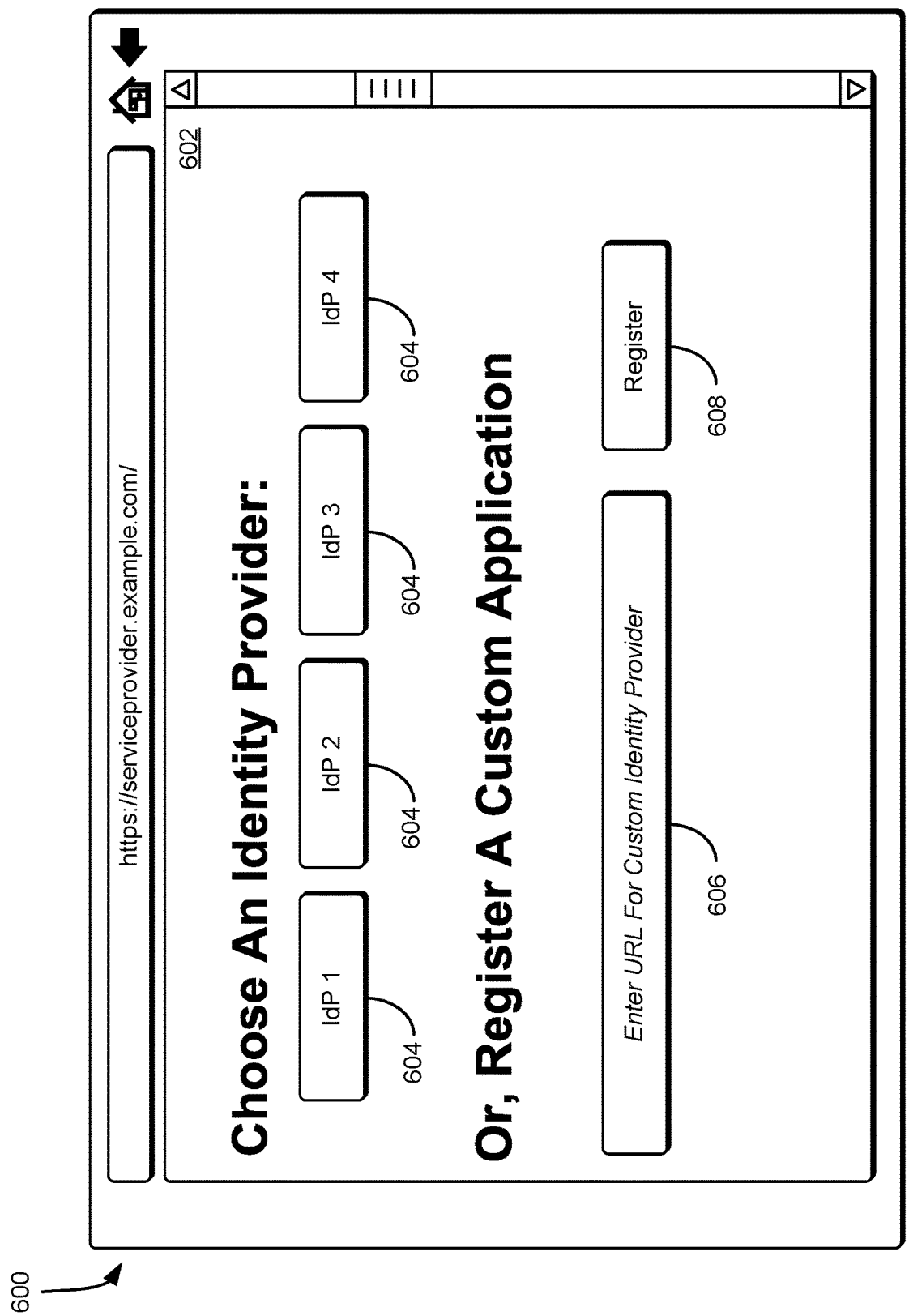
FIG. 6 shows an illustrative example of a system in which an interface is provided for identifying an identity provider for establishing federated authentication in accordance with at least one embodiment.

FIG. 6 shows an illustrative example of a system 600 in which an interface 602 is provided for identifying an identity provider for establishing federated authentication in accordance with at least one embodiment. In an embodiment, the interface 602 includes one or more identity provider graphical buttons 604 that corresponds to a known identity provider having a predefined federation discovery file. The interface 602 also includes a custom identity provider field 606, which enables the user of the interface 602 to specify a URI. The URI corresponds to a location where the federation discovery file for an identity provider is stored. The interface 602, in one embodiment, also includes a register graphical button 608. Selection of the register graphical button 608, in an embodiment, causes the service provider to initiate the registration process for the selected identity provider, identified based at least in part on selection of an identity provider graphical button 604 or input provided in the identity provider field 606.

In an embodiment, the service provider loads the federation discovery file of the selected identity provider and extracts the handshake endpoint using the URI specified in the federation discovery file. The service provider redirects the user of the interface 602 to the handshake endpoint, including the service provider's URI for its federation discovery file. In an embodiment, the service provider maintains in a data store (e.g., a database as described above) a list of identity providers that are authorized for use, and uses this information to present applicable options during a sign-on procedure by the user. Further, the service provider stores authorization information for each identity provider which serves (e.g., as an entitlement) to control what operations the identity providers are able to perform and how the identity providers are required to operate (e.g., whether a specific identity provider is to require multi-factor authentication, a specific type of authentication, etc.). From this point, the registration proceeds as described above in connection with FIG. 1. Identity providers are permitted to choose to alter the text of the experience to help end-users better understand what is happening as they get redirected between the service provider and the identity providers.

Figure 7:
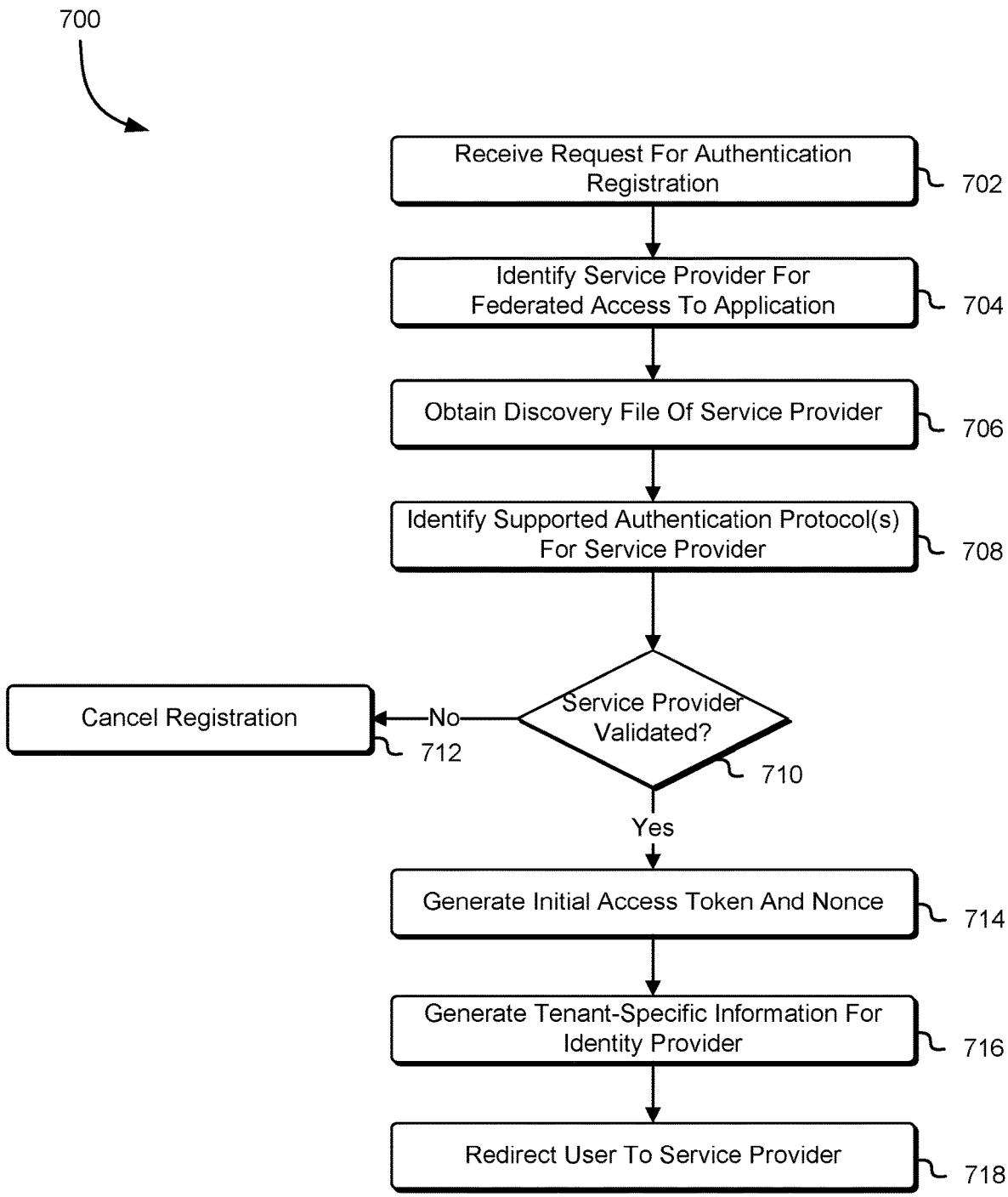
FIG. 7 shows an illustrative example of a process for federated authentication registration between an identity provider and a service provider specified by a user in accordance with at least one embodiment.

FIG. 7 shows an illustrative example of a process 700 for federated authentication registration between an identity provider and a service provider specified by a user in accordance with at least one embodiment. The process 700 is performed by an identity provider in response to a request from a user to register a federation relationship between the identity provider and a service provider to enable single sign-on capabilities for accessing an application provided by the service provider. In an embodiment, the identity provider renders a user interface, which is usable by a user to initiate the authentication registration process for enabling single sign-on access to an application provided by a service provider. As illustrated in FIG. 2, the interface includes one or more graphical buttons corresponding to known service provider, each of which associated with a predefined URI for a federation discovery file. The interface, in an embodiment, also includes an input field, whereby a user is permitted to input a URI corresponding to a federation discovery file of a service provider that provides a custom application. Through selection of a graphical button or input of a URI corresponding to a federation discovery file, in an embodiment, the user submits a request for authentication registration for enabling single sign-on access to an application, such as a SaaS application.

The identity provider receives 702 the request for authentication registration of a particular application and identifies 704, based at least in part on the request, a service provider for federated access to the application. In an embodiment, if the user has selected a graphical button corresponding to a known service provider, the identity provider obtains and utilizes a predefined URI for a federation discovery file to establish a communications channel with the service provider or other system that stores the federation discovery file. Alternatively, if the user has provided a URI to the location of a federation discovery file of a service provider, the identity provider utilizes the provided URI to establish the communications channel with the service provider or other system.

Using the predefined URI or the URI provided by the user, the identity provider accesses the location of the federation discovery file of the service provider and obtains 706 the federation discovery file. In an embodiment, the identity provider extracts and identifies 708, from the federation discovery file, the service provider's supported authentication protocols and the federation registration handshake endpoint URI. Based at least in part on the supported authentication protocols supported by the service provider, the identity provider determines 710 whether the service provider is validated. Based at least in part on the supported authentication protocols supported by the service provider, the identity provider determines whether it is compatible with any of these authentication protocols. The identity provider, in an embodiment, performs additional validation, such as ensuring that the selected application is part of a whitelisted collection of trusted applications.

If the identity provider is unable to validate the service provider, the identity provider cancels 712 the registration process. The identity provider updates the interface provided to the user to indicate that the registration process has been cancelled, as well as other information detailing the nature of the validation failure. However, if the identity provider validates the service provider, the identity provider generates 714 an initial access token and a nonce that is provided to the service provider to enable the service provider to access the identity provider's tenant-specific information. The initial access token and nonce are usable by the service provider to call an OAuth endpoint and attain access tokens and refresh tokens in order to interact with the identity provider programmatically. In an embodiment, the identity provider also generates a return URI, which is used by the service provider to redirect the administrator or other user back to the identity provider to finish the federation registration handshake.

Additionally, in an embodiment, the identity provider generates 716 or otherwise makes available private tenant-specific information that is used by the service provider and other authorized entities (e.g., other service providers, etc.) to configure the federation registration handshake. Access to the tenant-specific information is restricted to holders of the initial access token generated by the identity provider. The tenant-specific information, in one embodiment, includes a displayable name for the identity provider, a logo URI that is used to provide a location for a displayable logo that represents the identity provider, at least one authentication protocol that the identity provider supports and uses, an OAuth token endpoint for the location where a refresh token is usable as part of an OAuth token exchange for obtaining an access token, a SCIM endpoint URI, and one or more supported attributes that describe the collection of SCIM user attributes that the identity provider can make available. Other information that is specified in the tenant-specific information is described above in connection with FIG. 1.

The identity provider, in an embodiment, redirects 718 the user that submitted the request to the service provider to execute a similar sequence of operations to those described above. This redirection of the user, in one embodiment, is accomplished by issuing an HTTP 302 response to the location that the service provider has specified in its federation discovery file. In the response, the identity provider provides the initial access token and nonce, as well as the return URI and the URI for the tenant-specific information.

Figure 8:
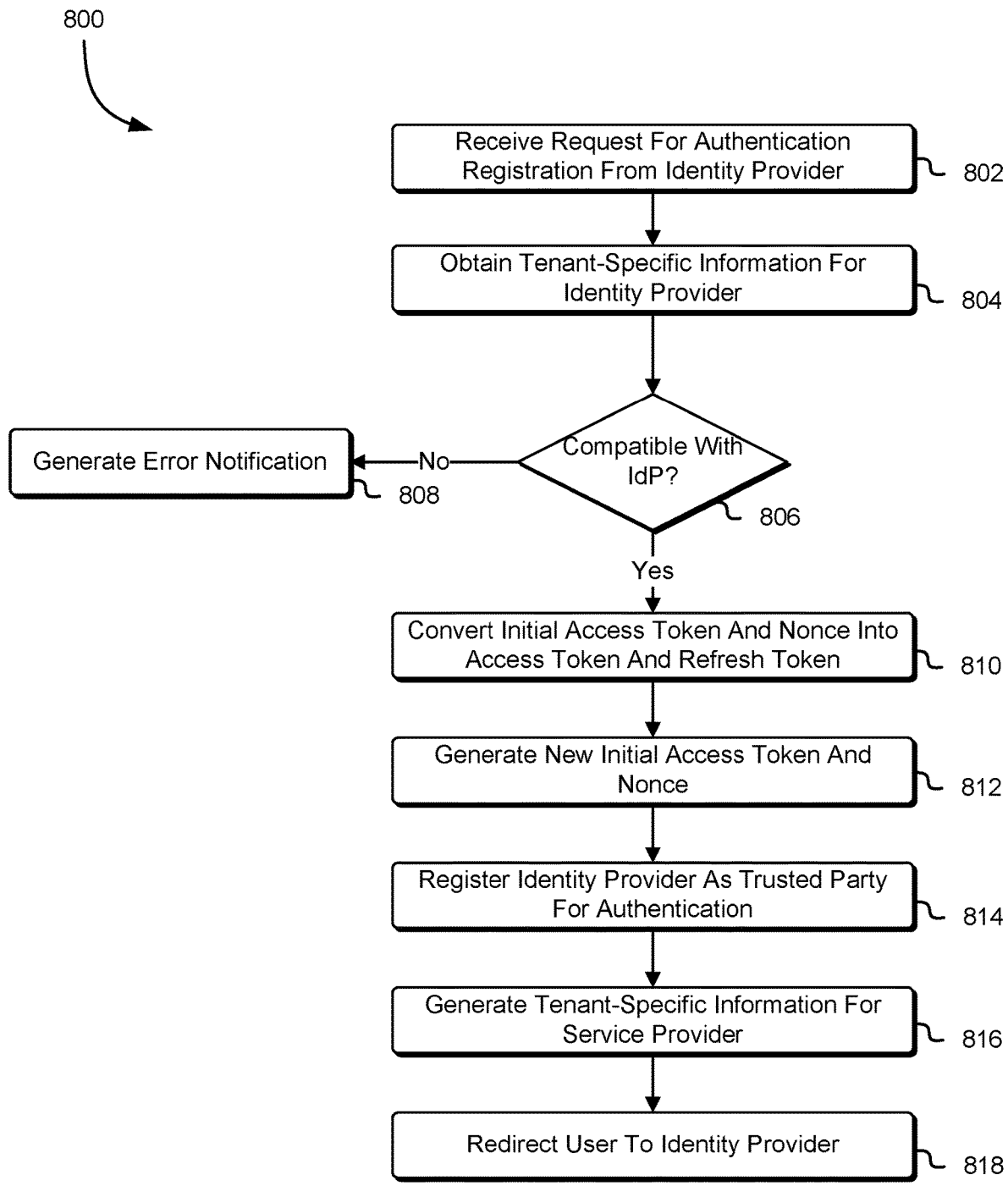
FIG. 8 shows an illustrative example of a process for registering a federated relationship with the identity provider in accordance with at least one embodiment.

FIG. 8 shows an illustrative example of a process 800 for registering a federated relationship with the identity provider in accordance with at least one embodiment. The process 800 is performed by a service provider in response to a request from a user resulting from a redirection of the user from the identity provider to the service provider. In an embodiment, the service provider receives 802 the request for authentication registration from the user and begins its federation registration process. The request for authentication is provided by the user in response to an HTTP 302 response from the identity provider that causes the user to be redirected to the service provider. The federation registration process, in one embodiment, includes authenticating the user, enabling the user to create a new account, configuring settings for billing the user, and the like. Further, in an embodiment, the service provider obtains the initial access token from the response and uses the URI for the tenant-specific information to obtain 804 the tenant-specific information of the identity provider. The service provider extracts the attributes from the tenant-specific information and determines 806 whether it is compatible with the identity provider. In an embodiment, the service provider examines the authentication protocols, the supported attributes, and specific details within the SAML/OIDC configuration files to determine whether any incompatibilities exist. If any incompatibilities exist, the service provider stops performing the registration process and generates 808, via a user interface, an error notification or performs one or more operations to resolve the detected incompatibilities.

In an embodiment, if the service provider determines that it is compatible with the identity provider (e.g., the service provider supports the authentication protocols specified by the identity provider, etc.), the service provider uses the OAuth endpoint specified in the tenant-specific information to convert 810 the initial access token and nonce into an access token and a refresh token. The access token and refresh token are used for future communications where the service provider initiates communication with the identity provider. Further, the service provider generates 812 its own initial access token and nonce that are to be provided to the identity provider. This newly generated initial access token and nonce is usable by the identity provider to complete its processes for establishing the federation registration handshake.

The service provider registers 814 the identity provider as a trusted party for single sign-on authentication purposes. In an embodiment, the service provider stores single sign-on information in a database and schedules recurring activities, including cryptographic key rotations. The database is implemented as a web service, such as a multi-tenant web service hosted by a computing resource service provider, which, in an embodiment, is the same entity as the identity provider or a different entity. In addition, the service provider, in an embodiment, generates 816 or otherwise makes available its own tenant-specific information. Access to this tenant-specific information is restricted to holders of the initial access token generated by the service provider, such as the identity provider. In an embodiment, once the tenant-specific information for the service provider has been generated or otherwise made available, the service provider redirects 818 the user to the identity provider. The redirection of the user, in an embodiment, is accomplished by issuing an HTTP 302 response to the location originally provided by the identity provider in the return URI. As part of the return parameters, the service provider provides access tokens and the location of the service provider's tenant-specific information.

Figure 9:
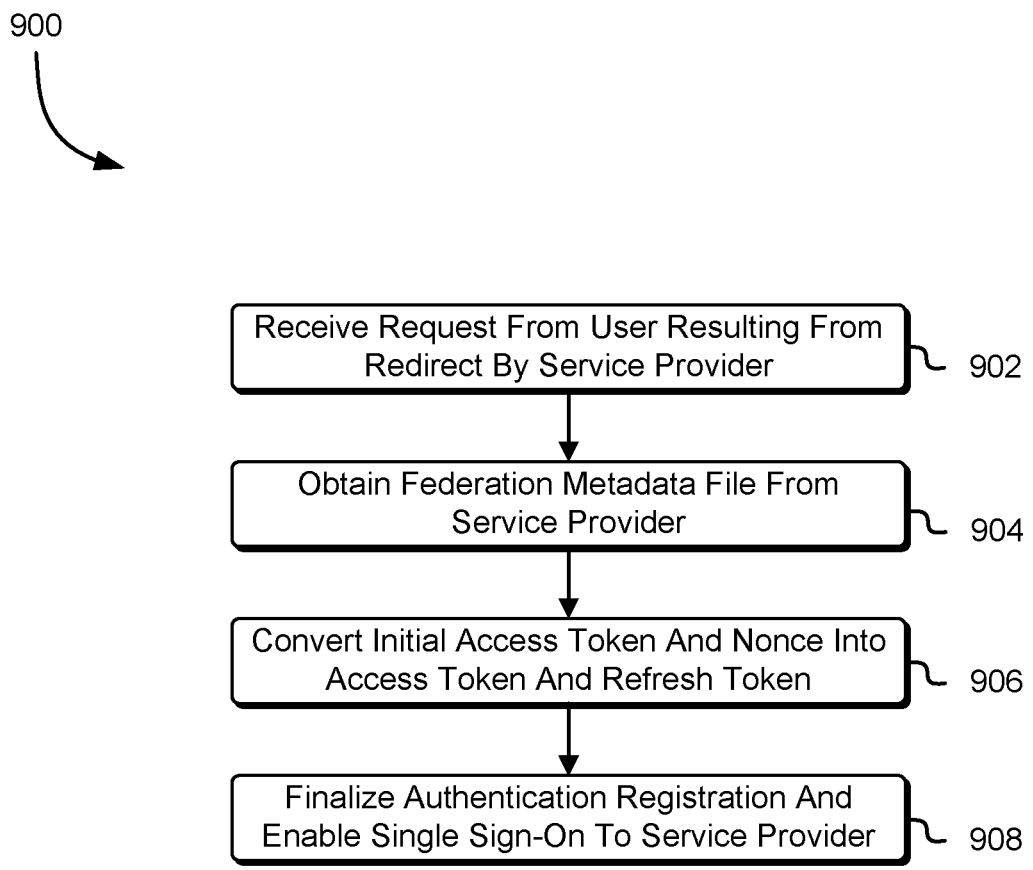
FIG. 9 shows an illustrative example of a process for finalizing the federated authentication registration for a user in accordance with at least one embodiment.

FIG. 9 shows an illustrative example of a process 900 for finalizing the federated authentication registration for a user in accordance with at least one embodiment. The process 900 is performed by the identity provider (i.e., a computer system of the identity provider) in response to receiving the redirection of a user from the service provider. At any time during the registration process and after it has redirected a user to the service provider, the identity provider receives 902 a request from the user to complete the registration process. The request is generated in response to a HTTP 302 response by the service provider that causes the user to be redirected to the identity provider. In response to the request from the user, the identity provider obtains 904 the service provider's tenant-specific information by using the initial access token provided by the service provider. The identity provider uses the OAuth endpoint URI specified in the tenant-specific information to access the OAuth endpoint and convert 906 the initial access token and nonce into an access token and a refresh token. These tokens are used for future communications where the identity provider initiates communication to the service provider. The identity provider finalizes 908 the authentication registration and enables single sign-on to the service provider for the administrator. In an embodiment, the identity provider persists the single sign-on information into a database, grants permissions, and schedules recurring activities, such as key rotations.

Figure 10:
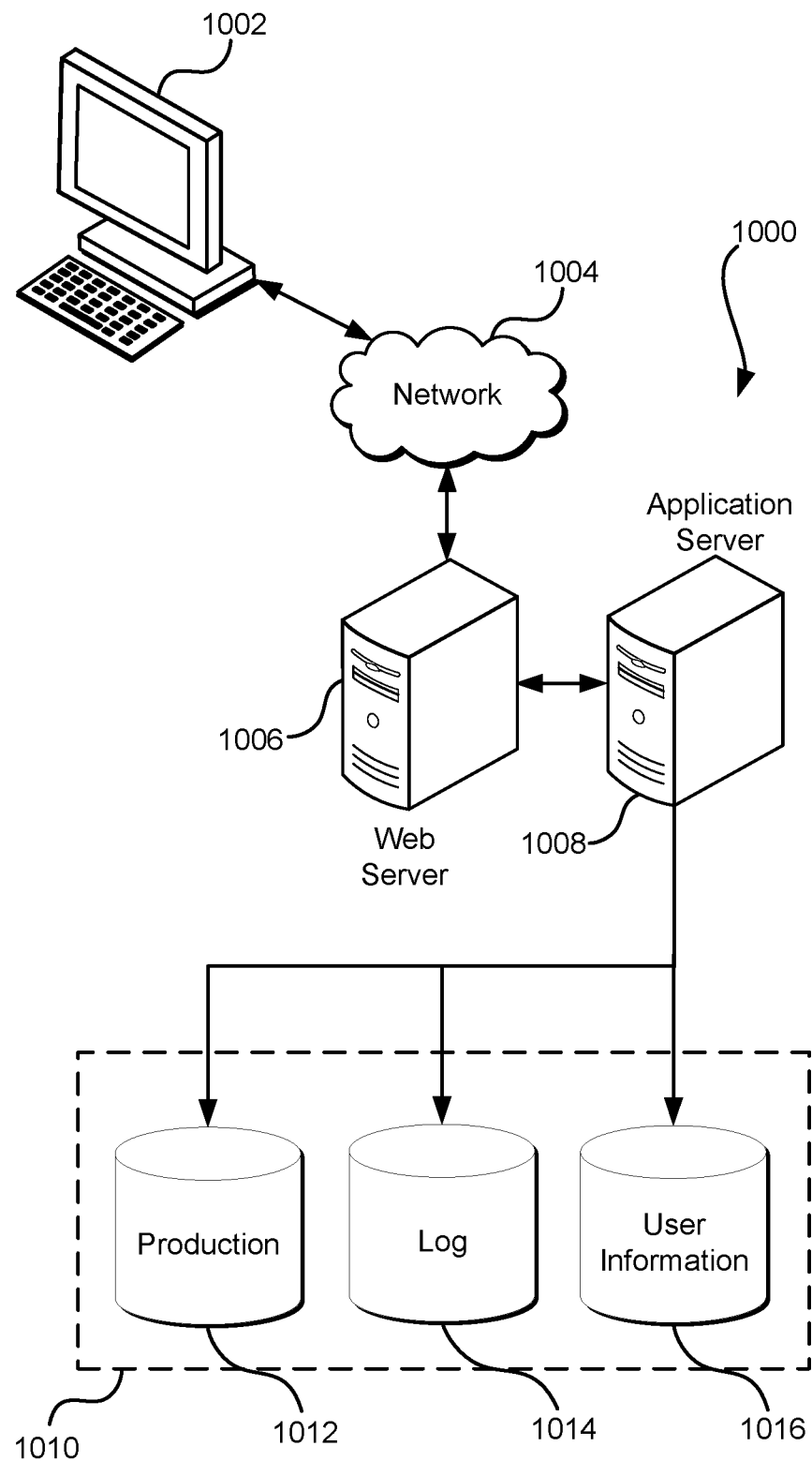
FIG. 10 illustrates a system in which various embodiments can be implemented.

FIG. 10 illustrates aspects of an example system 1000 for implementing aspects in accordance with various embodiments. As will be appreciated, although a web-based system is used for purposes of explanation, different systems may be used, as appropriate, to implement various embodiments. The system includes an electronic client device 1002, which includes any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network includes any appropriate network, including an intranet, the Internet, a cellular network, a local area network, a satellite network or any other such network and/or combination thereof. Components used for such a system, in one embodiment, depends at least in part upon the type of network and/or environment selected. Many protocols and components for communicating via such a network are well known and will not be discussed herein in detail. Communication over the network is enabled by wired or wireless connections and combinations thereof. In this example, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

The illustrative system includes at least one application server 1008 and a data store 1010. It should be understood that there are several application servers, layers or other elements, processes or components, which may be chained or otherwise configured, which interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server includes any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, that is handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 includes several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which is used to serve content for the production side. The data store also is shown to include a mechanism for storing log data 1014, which is used for reporting, analysis or other such purposes. It should be understood that there are many other aspects that may need to be stored in the data store, such as page image information and access rights information, which is stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and access the catalog detail information to obtain information about items of that type. The information is then returned to the user, such as in a results listing on a web page that the user is able to view via a browser on the user device 1002. Information for a particular item of interest is viewable in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further are implemented in a wide variety of operating environments, which in some cases include one or more user computers, computing devices or processing devices which are used to operate any of a number of applications. User or client devices include any of a number of computers, such as desktop, laptop or tablet computers running a standard operating system, as well as cellular, wireless and handheld devices running mobile software and capable of supporting a number of networking and messaging protocols. Such a system also includes a number of workstations running any of a variety of commercially-available operating systems and other known applications for purposes such as development and database management. These devices also include other electronic devices, such as dummy terminals, thin-clients, gaming systems and other devices capable of communicating via a network. These devices also include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network is, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols are either reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server runs any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system includes, in one embodiment, a variety of data stores and other memory and storage media as discussed above. These reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device includes hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also include a computer-readable storage media reader, a communications device (e.g., a modem, a network card (wireless or wired), an infrared communication device, etc.), and working memory as described above. The computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which is used to store the desired information and which is accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but, in an embodiment, is more when so indicated either explicitly or by context.

Operations of processes described herein are performable in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at an identity provider, a request to configure authentication for enabling single sign-on to a service provider, the request containing an identifier usable to retrieve protocol information;
    identifying authentication protocols supported by the service provider based on the protocol information;
    determining, based at least in part on the authentication protocols supported by the service provider, that the identity provider is compatible with the service provider;
    generating configuration information of the identity provider, the configuration information usable by the service provider to configure the authentication; and
    transmitting, to a computer system, a response to the request that causes the computer system to be redirected to the service provider and that indicates information usable by the service provider to obtain the configuration information to configure the authentication.

2. The computer-implemented method of claim 1, further comprising:
    identifying, from the identifier, a Uniform Resource Identifier corresponding to a location for a file of the service provider; and
    retrieving the protocol information using the identifier by:
        using the Uniform Resource Identifier to obtain the file from the location; and
        extracting, from the file, the authentication protocols supported by the service provider.

3. The computer-implemented method of claim 1, wherein the configuration information usable by the service provider to obtain the configuration information includes a token usable by the service provider to access the configuration information.

4. The computer-implemented method of claim 1, further comprising:
    obtaining a second request, wherein the second request is transmitted as a result of a redirect response from the service provider to the computer system;
    using information from the second request to obtain second configuration information; and
    using the second configuration information to enable single sign-on to the service provider using the authentication.

5. A system, comprising:
    one or more machine-readable mediums comprising a set of instructions, which, as a result of execution by one or more processors, cause the system to at least:
        obtain, at a first computer system, a request to configure authentication for a second computer system, the request usable to retrieve protocol information, wherein the request indicates a location of a file that specifies a set of authentication protocols supported by a third computer system;

retrieve the protocol information to determine compatibility of the first computer system and the third computer system; and transmit, to the second computer system, a response to the request that indicates the third computer system and that indicates configuration information to be transmitted to the third computer system to configure authentication.

6. The system of claim 5, wherein:

the set of instructions further cause the system to:

obtain, from the location, the file; and determine, based at least in part on the set of authentication protocols supported by the third computer system specified in the file, that the first computer system is compatible with the third computer system.

7. The system of claim 5, wherein the configuration information includes a token usable to access tenant-specific information for the second computer system, the tenant-specific information for the second computer system usable to configure the authentication.

8. The system of claim 5, wherein the set of instructions, as a result of execution by one or more processors, further cause the system to:

obtain, from the second computer system, a second request that indicates second information usable by the first computer system to configure the authentication;

use the second information to obtain second configuration information for the third computer system; and configure the authentication using the second configuration information.

9. The system of claim 5, wherein the response includes a HyperText Transfer Protocol response that causes the second computer system to be redirected from the first computer system to the third computer system.

10. The system of claim 5, wherein the first computer system is an identity provider and the third computer system is a service provider.

11. The system of claim 5, wherein the first computer system is a service provider and the third computer system is an identity provider.

12. The system of claim 5, wherein the authentication is configured using a Security Assertion Markup Language protocol.

13. A non-transitory computer-readable storage medium storing thereon a set of instructions that, in response to execution by one or more processors of a computer system, cause the computer system to at least:

obtain, at a first computer system, a request to configure authentication, the request identifying a location of a file that specifies authentication protocols supported by a second computer system;

based on the request, retrieve compatibility information;

determine compatibility between the first computer system and the second computer system based on the compatibility information; and transmit, to a third computer system, a response to the request that indicates the second computer system and that indicates information to be transmitted to the second computer system to configure authentication.

14. The non-transitory computer-readable storage medium of claim 13, wherein the authentication is configured using an OpenID Connect authentication protocol.

15. The non-transitory computer-readable storage medium of claim 13, wherein the set of instructions, in response to execution by the one or more processors, further cause the computer system to:

generate a token and a nonce usable to access tenant-specific information for the first computer system usable to configure the authentication; and include, in the information to be transmitted to the third computer system, the token and the nonce to enable the third computer system to access the tenant-specific information.

16. The non-transitory computer-readable storage medium of claim 13, wherein:

retrieving the compatibility information includes utilizing a Uniform Resource Identifier to identify the location of the file and obtain the file from the location; and determining compatibility includes determining, based at least in part on a set of authentication protocols identified from the file, that the first computer system is compatible with the second computer system.

17. The non-transitory computer-readable storage medium of claim 13, wherein the response causes the third computer system to be redirected from the first computer system to the second computer system.

18. The non-transitory computer-readable storage medium of claim 13, wherein the set of instructions, in response to execution by the one or more processors, further cause the computer system to:

obtain, from the third computer system, a second request that indicates a location for second information to configure the authentication;

obtain, from the location, the second information; and configure the authentication using the second information.

19. The non-transitory computer-readable storage medium of claim 18, wherein the set of instructions further cause the computer system to obtain, from the location, a token usable to initiate communications with the third computer system.

20. The non-transitory computer-readable storage medium of claim 13, wherein:

the request is obtained via an interface provided by the first computer system, the interface specifying a set of computer systems for configuring the authentication, the second computer system part of the set of computer systems; and the request indicates selection of the second computer system via the interface.

* * * * *